United States Patent
Chao

[11] 3,944,803
[45] Mar. 16, 1976

[54] LANTERN SAFETY DEVICE

[75] Inventor: Albert Chao, Flushing, N.Y.

[73] Assignee: Lawrence Peska Associates, Inc., New York, N.Y. ; a part interest

[22] Filed: Aug. 28, 1974

[21] Appl. No.: 501,027

[52] U.S. Cl........... 240/6.4 W; 240/10.6 R; 240/59; 340/331
[51] Int. Cl.² F21V 33/00; G08B 5/00; H05B 39/00; H05B 41/00
[58] Field of Search... 240/6.4 W, 59, 10 R, 10.6 R, 240/10.6 CH; 315/206; 340/321, 331; 136/166, 173

[56] References Cited
UNITED STATES PATENTS

| | | | |
|---|---|---|---|
| 2,721,257 | 10/1955 | Knox | 240/6.4 W X |
| 3,120,632 | 2/1964 | Hopt et al. | 240/10.6 CH |
| 3,153,745 | 10/1964 | Gurian et al. | 315/206 |
| 3,521,049 | 7/1970 | Young | 240/6.4 W |
| 3,714,414 | 1/1973 | Sternius | 240/10 R |
| 3,737,648 | 6/1973 | Franc | 240/10.6 R |
| 3,840,853 | 10/1974 | Cukale | 240/6.4 W X |

*Primary Examiner*—Richard A. Wintercorn
*Attorney, Agent, or Firm*—Richard E. Nanfeldt

[57] ABSTRACT

An illuminated safety device is worn on the collar of a pet or a belt of a person at night time enabling a driver of an automobile to observe the person or animal. The safety device comprises a lantern tape communicating with a power source, wherein the lantern tape and power source are affixed to the belt or collar. The lantern tape comprises a plurality of colored light bulbs sealed between two transparent flexible plastic strips. The electrical circuit can be designed for continuous illumination or a flashing of the light bulbs.

4 Claims, 5 Drawing Figures

U.S. Patent   March 16, 1976   3,944,803
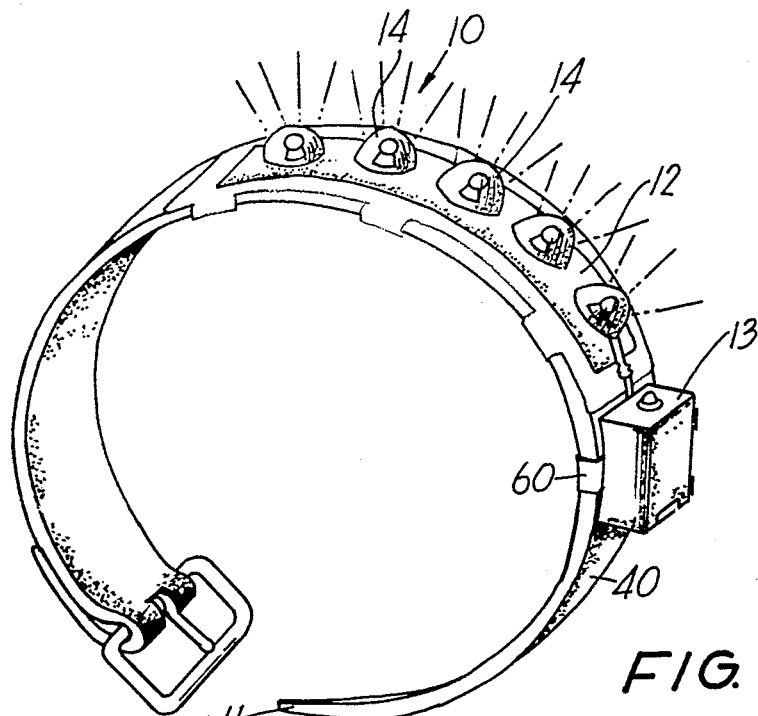
FIG. 1
FIG. 3
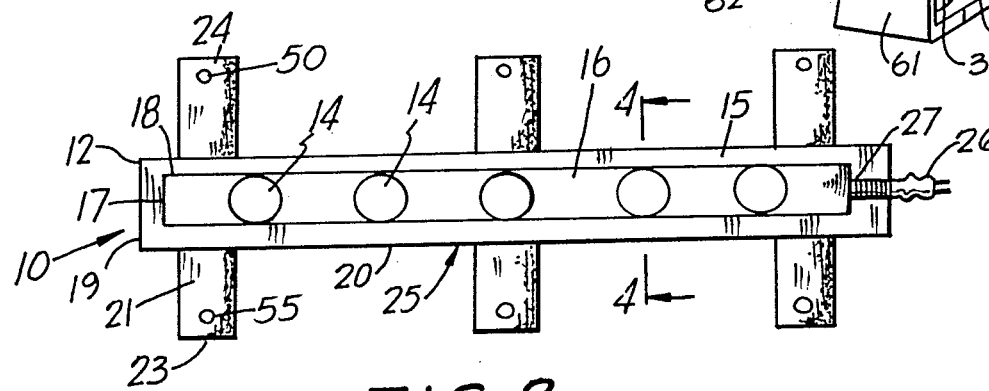
FIG. 2
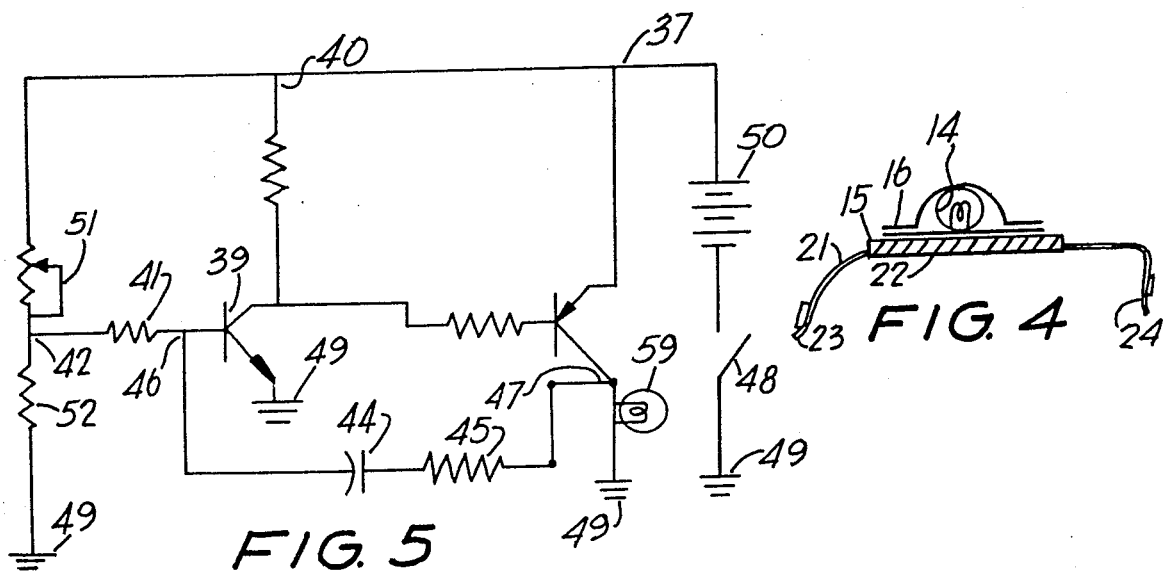
FIG. 5
FIG. 4

LANTERN SAFETY DEVICE

SUMMARY OF THE INVENTION

My invention relates to a unique and novel device used to illuminate an animal or person at night, wherein the driver of an automobile can observe the animal or person.

It is an object of my present device to provide a safety device detachably mountable to an animal's collar or a person's belt, wherein the safety device is either continuously illuminated or flashes off and on.

A further object of my present invention is to provide a battery power pak to illuminate the safety device.

A still further object of my present invention is to provide a lantern safety device of simple design and low manufacturing cost.

An advantage of my present invention is that it provides a positive means of reducing accidents at night time between a motor vehicle and either an animal or a person.

Briefly, my present invention comprises a plurality of electrical light bulbs sealed between two transparent flexible plastic strips, wherein a means is provided for detachably mounting the plastic strip composite to a belt or collar. A battery operated power pak communicates with the electrical circuit of light bulbs, wherein the power pak is detachably attached to the collar or belt. The electrical circuit can be designed for continuous illumination or a flashing off and on of the light bulbs.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a perspective view of the invention in use;

FIG. 2 illustrates a top view of the lantern tape;

FIG. 3 illustrates a perspective view of the power pak;

FIG. 4 illustrates an end view of the lantern tape in use; and

FIG. 5 illustrates a schematic diagram of the electrical circuit of the invention.

DESCRIPTION OF THE PREFERRED EMBODIMENT

Turning now descriptively to the drawings, in which similar reference characters denote similar elements throughout the several views, FIGS. 1, 2, 4 show a lantern device 10 affixed to a pet's collar 11 or a person's belt 11, wherein the lantern device 10 allows the person or animal to be visible to the driver of an automobile at night resulting in a decrease in the number of accidents at night. The lantern device 10 comprises a lantern tape 12 and a power pak 13 affixed to the collar 11. The lantern tape 12 comprises a plurality of 2.5 volt colored light bulbs 14 arranged in a row, wherein the bulbs 14 are sealed between a bottom thin flexible plastic strip 15 and a top thin flexible plastic strip 16. The lateral width 17 and longitudinal length 18 of strip 16 is less than the second lateral width 19 and second longitudinal length 20 of strip 15, wherein strips 15, 16 are both transparent. A plurality of rectangular shaped tape members 21 are affixed perpendicularly across the bottom surface 22 of the bottom strip 15, wherein the first and second outer ends 23, 24 of each member 21 extends outward from the longitudinal edges 25 of the bottom strip 21. A hook 55 is affixed to the first end 23 and a catch 56 is affixed to the second end 24 of member 21. The bottom surface 22 of bottom strip 15 engages a top surface 40 of the collar 11, wherein outer ends 23, 24 are folded under collar 11 and clasped together. An electrical male plug 26 communicating with the electrical circuit of the bulbs 14 extends outward from the end 27 of the top strip 16. FIGS. 1, 3 show a power pak 13 secured to the collar 11. The power pak 13 comprises a rectangular boxhousing 28 having a longitudinally hinged front face 29. A pair of 1.5 volt batteries 30 are inserted within chamber 31 of housing 28, wherein the batteries 30 communicate with a female electrical receptacle 32 contained in a top base 33 of housing 28. Male plug 26 communicates with the female receptacle 33 of power pak 13. A second rectangular shaped tape member 34 is affixed to a back face 35 of housing 28, wherein the free ends 36, 60 of member 34 extend outward from the sides 61 of the housing 28. A second hook and catch assembly 62 are affixed to the free ends 36, 37 of member 34, wherein the free ends 36, 37 are secured to each other under collar 11 with the back face 35 of housing 28 engaging the top surface 40 of collar 11. The electrical circuit of the bulbs can be a standard series design, wherein continuous illumination of the bulbs 14 is effected or a specially designed circuit as shown in FIG. 5, wherein the bulbs flash off and on. This flashing circuit 57 consists essentially of a switch 48 having a ground 49 in a first series circuit to a three volt battery 50, a variable resistor 51, and a first fixed resistor 52, wherein resistor 52 is joined to ground 49. A second series circuit of a PNP transistor 58 and light bulb 59 is wired in a parallel circuit to the first series circuit, wherein transistor 58 is joined on its emittor side to an electrical juncture 37 contained between battery 50 and resistor 51 in the first series circuit and bulb 59 communicates with ground 49. A third series circuit of a second fixed resistor 38 and an NPN transistor 39 is wired in parallel to the first series circuit, wherein resistor 38 is joined to a second electrical juncture 40 contained between first juncture 37 and resistor 51 in the first series circuit and transistor 39 is wired on its emittor side to ground 49. A third fixed resistor 41 is wired between transistor 39 and a third electrical juncture 42, wherein juncture 42 is contained between variable resistor 51 and resistor 52. A fourth fixed resistor 43 is wired between transistors 58 and sixth electrical juncture 63, wherein juncture 63 is contained between resistor 38 and transistor 39. A fourth series circuit of a capacitor 44 and a fifth fixed resistor 45 is wired between junctures 46, 47. Fourth electrical juncture 46 is contained between resistor 41 and transistor 39 and the fifth electrical juncture 47 is contained between transistor 58 and bulb 59. When the variable resistor 51 is increased to a given resistance, electrical current is forced to follow directly through transistor 58 to bulb 59 by-passing the capacitor 44 and eliminating the flashing mechanism. When the resistance of the variable resistor 51 is decreased, the electrical current flows through capacitor 44 causing the capacitor 44 to alternately charge and discharge. When the capacitor 44 is discharging, the electrical current flows to the bulb 59 causing the bulb 59 to illuminate. A plurality of bulbs 59 can be wired in series, wherein the bulbs 59 are contained in the lantern tape 12 or alternatively embedded in the collar.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A latern device adapted to detachably mount onto an animal's collar or a person's belt, which comprises:
   a. a bottom transparent flexible plastic strip;
   b. a top transparent flexible plastic strip;
   c. a plurality of colored light bulbs sealed between said bottom plastic strip and said top plastic strip;
   d. an electrical circuit joining said plurality of colored bulbs together;
   e. a means for supplying power to said electric circuit; and
   f. a means for detachably attaching said latern device to said animal's collar including a plurality of rectangularly shaped members affixed to a bottom surface of said bottom plastic strip, a pair of outer ends of each said rectangularly shaped tape member looping around said collar, said outer end securing to each other.

2. A lantern device as recited in claim 1, wherein said means of supplying power to said electrical circuit comprises:
   a. a rectangular box housing having an interior chamber and a hinged front face;
   b. a pair of batteries contained in said interior chamber;
   c. a female electrical receptacle in a top face of said rectangular box housing;
   d. a male electrical plug communicating with said female electrical receptacle as well as said electrical circuit;
   e. a second rectangular shaped tape member affixed to a back face of said rectangular box housing; and
   f. a pair of free ends of said second tape member looping around said collar, wherein said free ends securing to each other.

3. A lantern device as recited in claim 1, wherein said electrical circuit being similar to ones used in ornamental Christmas tree lights.

4. A lantern device as recited in claim 1, wherein said electrical circuit consists essentially of:
   a. a first series circuit comprising a switch having a ground, a three volt battery, a first electrical juncture, a second electrical juncture, a variable resistor, a third electrical juncture, and a first fixed resistor;
   b. a second series circuit comprising a PNP transistor and a light bulb, wherein said PNP transistor joined to said first juncture and said light joined to said ground;
   c. a third series circuit comprising a second fixed resistor, and an NPN transistor wherein said second fixed resistor joined to second juncture and said NPN transistor joined to said ground;
   d. a third fixed resistor joined to said third juncture and said NPN transistor;
   e. a fourth series circuit of a capacitor and a fifth fixed resistor wired to a fourth and a fifth electrical juncture, wherein said fourth juncture contained between said third fixed resistor and said NPN transistor and said fifth juncture contained between said PNP transistor and said light bulb;
   f. a fourth fixed resistor wired between said PNP transistor and a sixth electrical juncture, wherein said sixth electrical juncture contained between said second fixed resistor and said NPN transistor.

* * * * *